United States Patent
Westhoff et al.

(10) Patent No.: US 9,139,751 B2
(45) Date of Patent: *Sep. 22, 2015

(54) POLYURETHANE COATING MATERIAL COMPOSITION, MULTISTAGE COATING METHODS USING THESE COATING MATERIAL COMPOSITIONS, AND ALSO THE USE OF THE COATING MATERIAL COMPOSITION AS CLEARCOAT MATERIAL AND PIGMENTED COATING MATERIAL, AND APPLICATION OF THE COATING METHOD FOR AUTOMOTIVE REFINISH AND/OR FOR THE COATING OF PLASTICS SUBSTRATES AND/OR OF UTILITY VEHICLES

(75) Inventors: Elke Westhoff, Steinfurt (DE); Peter Hoffmann, Senden (DE); Bernadette Moeller, Maria-Veen (DE); Benedikt Schnier, Warendorf (DE)

(73) Assignee: BASF Coatings GmbH, Muenster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/005,474

(22) PCT Filed: Jan. 30, 2012

(86) PCT No.: PCT/EP2012/051444
§ 371 (c)(1),
(2), (4) Date: Nov. 25, 2013

(87) PCT Pub. No.: WO2012/123161
PCT Pub. Date: Sep. 20, 2012

(65) Prior Publication Data
US 2014/0161981 A1    Jun. 12, 2014

Related U.S. Application Data

(60) Provisional application No. 61/452,187, filed on Mar. 14, 2011.

(30) Foreign Application Priority Data

Mar. 14, 2011  (EP) .................................... 11158059

(51) Int. Cl.
| C09D 175/04 | (2006.01) |
| C08G 18/22 | (2006.01) |
| B05D 3/02 | (2006.01) |
| B05D 7/00 | (2006.01) |
| C08G 18/18 | (2006.01) |
| C08G 18/16 | (2006.01) |

(52) U.S. Cl.
CPC ............... *C09D 175/04* (2013.01); *B05D 3/02* (2013.01); *B05D 3/0209* (2013.01); *B05D 7/50* (2013.01); *B05D 7/52* (2013.01); *B05D 7/53* (2013.01); *B05D 7/534* (2013.01); *C08G 18/163* (2013.01); *C08G 18/18* (2013.01); *C08G 18/22* (2013.01)

(58) Field of Classification Search
None
See application file for complete search history.

(56) References Cited

U.S. PATENT DOCUMENTS

| 2,196,447 | A | * | 4/1940 | Peski ............................... 556/33 |
| 3,795,636 | A |   | 3/1974 | Huffman et al. |
| 4,006,124 | A | * | 2/1977 | Welte et al. ..................... 528/52 |
| 4,598,131 | A |   | 7/1986 | Prucnal |
| 4,939,213 | A |   | 7/1990 | Jacobs, III et al. |
| 5,084,541 | A |   | 1/1992 | Jacobs, III et al. |
| 5,716,678 | A |   | 2/1998 | Rockrath et al. |
| 5,847,044 | A |   | 12/1998 | Laas et al. |

(Continued)

FOREIGN PATENT DOCUMENTS

| DE |     2434185 A1 | 2/1976 |
| DE | 102008026341 A1 | 11/2009 |

(Continued)

OTHER PUBLICATIONS

Werner J. Blank, Z.A. He, and Ed. T. Hessell, "Catalysis of the Isocyanate-Hydroxyl Reaction by Non-Tin Catalysts", King Industries Inc., Norwalk, CT, www.wernerblank.com, 15 pages.

Römpp Lexikon "Lacke and Druckfarben," Georg Thieme Verlag, Stuttgart, 1998, pp. 250 to 252, 5 pages.

International Search Report for International Application No. PCT/EP2012/051444 mailed Feb. 29, 2012, 3 pages.

(Continued)

*Primary Examiner* — Erma Cameron
(74) *Attorney, Agent, or Firm* — Servilla Whitney LLC

(57) ABSTRACT

Disclosed are coating material compositions comprising at least one polyhydroxyl group-containing compound (A), at least one polyisocyanate group-containing compound (B) having free and/or blocked isocyanate groups, at least one catalyst (D) based on a zinc-amidine complex which comprises the reaction product of 1.0 moles of at least one zinc(II) biscarboxylate with more than 2.0 moles of at least one amidine

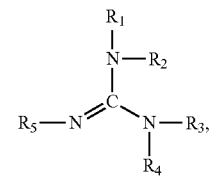

where $R_5$=hydrogen and $R_1$, $R_2$, $R_3$, and $R_4$ are each identical or different radicals, $R_1$ and $R_3$ being hydrogen or an alkyl radical or an aryl radical, and $R_2$ and $R_4$ being an alkyl radical or an aryl radical, and at least one monomeric aromatic, optionally substituted carboxylic acid (S) whose carboxyl group is in conjugation with a π-electron system.

25 Claims, No Drawings

(56) References Cited

U.S. PATENT DOCUMENTS

| | | | |
|---|---|---|---|
| 6,084,026 A * | 7/2000 | Jamasbi | 524/590 |
| 7,485,729 B2 | 2/2009 | Hsieh et al. | |
| 2005/0182189 A1 | 8/2005 | Ohrbom et al. | |
| 2006/0036007 A1 | 2/2006 | Hsieh et al. | |
| 2006/0247341 A1 | 11/2006 | Hsieh et al. | |
| 2009/0011124 A1 | 1/2009 | Hsieh et al. | |
| 2012/0225982 A1 * | 9/2012 | Ravichandran et al. | 524/196 |
| 2013/0344231 A1 * | 12/2013 | Eswarakrishnan et al. | 427/58 |
| 2014/0162074 A1 * | 6/2014 | Westhoff et al. | 428/423.1 |

FOREIGN PATENT DOCUMENTS

| | | |
|---|---|---|
| DE | 102008061329 A1 | 6/2010 |
| EP | 0008127 A1 | 2/1980 |
| EP | 0249201 A2 | 2/1987 |
| EP | 0276501 A2 | 8/1988 |
| EP | 0624577 A1 | 11/1994 |
| EP | 0692007 B1 | 1/1996 |
| EP | 0882748 A2 | 12/1998 |
| EP | 0994117 A1 | 4/2000 |
| EP | 1273640 A2 | 1/2003 |
| WO | WO9422968 A1 | 10/1994 |
| WO | WO9712945 A1 | 4/1997 |
| WO | WO0109260 A1 | 2/2001 |
| WO | WO2004029121 A1 | 4/2004 |
| WO | WO2006022899 A2 | 3/2006 |
| WO | WO2009135600 A1 | 11/2009 |

OTHER PUBLICATIONS

English Translation of International Search Report for International Application No. PCT/EP2012/051444 mailed Feb. 29, 2012, 2 pages.
Written Opinion for International Application No. PCT/EP2012/051444 mailed Feb. 29, 2012, 5 pages.
International Search Report for International Application No. PCT/EP2012/051574 mailed Aug. 6, 2012, 4 pages.
English Translation of International Search Report for International Application No. PCT/EP2012/051574 mailed Aug. 6, 2012, 2 pages.
Written Opinion for International Application No. PCT/EP2012/051574 mailed Aug. 6, 2012, 7 pages.
International Search Report for International Application No. PCT/EP2012/052284 mailed Jun. 4, 2012, 4 pages.
English Translation of International Search Report for International Application No. PCT/EP2012/052284 mailed Jun. 4, 2012, 3 pages.
Written Opinion for International Application No. PCT/EP2012/052284 mailed Jun. 4, 2012, 8 pages.
International Preliminary Report on Patentability for International Application No. PCT/EP2012/051444 issued Sep. 17, 2013, 5 pages.
English Translation of International Preliminary Report on Patentability for International Application No. PCT/EP2012/051444 issued Sep. 17, 2013, 5 pages.
International Preliminary Report on Patentability for International Application No. PCT/EP2012/051574 issued Sep. 17, 2013, 7 pages.
English Translation of International Preliminary Report on Patentability for International Application No. PCT/EP2012/051574 issued Sep. 17, 2013, 8 pages.
International Preliminary Report on Patentability for International Application No. PCT/EP2012/052284 issued Sep. 17, 2013, 8 pages.
English Translation of International Preliminary Report on Patentability for International Application No. PCT/EP2012/052284 issued Sep. 17, 2013, 10 pages.

* cited by examiner

POLYURETHANE COATING MATERIAL COMPOSITION, MULTISTAGE COATING METHODS USING THESE COATING MATERIAL COMPOSITIONS, AND ALSO THE USE OF THE COATING MATERIAL COMPOSITION AS CLEARCOAT MATERIAL AND PIGMENTED COATING MATERIAL, AND APPLICATION OF THE COATING METHOD FOR AUTOMOTIVE REFINISH AND/OR FOR THE COATING OF PLASTICS SUBSTRATES AND/OR OF UTILITY VEHICLES

CROSS REFERENCE TO RELATED APPLICATIONS

This application is a National Phase Application of Patent Application PCT/EP2012/051444 filed on 30 Jan. 2012, which claims priority to U.S. 61/452,187, filed 14 Mar. 2011 and EP 11158059.3 filed 14 Mar. 2011, of which all aforementioned applications are incorporated by reference herein in their entirety.

FIELD OF THE INVENTION

The present invention relates to coating material compositions comprising at least one polyhydroxyl group-containing compound (A), at least one polyisocyanate group-containing compound (B), and at least one catalyst (D) based on a zinc-amidine complex.

The present invention additionally provides multistage coating methods using these coating material compositions, and also the use of the coating material compositions as clearcoat material, and application of the coating method for automotive refinish and/or for the coating of plastics substrates and/or of utility vehicles.

BACKGROUND OF THE INVENTION

Polyurethane coating materials typically comprise a catalyst, and in this context not only acidic compounds but also, in particular, tertiary amines and/or metallic compounds, such as various tin compounds, for example, more particularly dibutyltin dilaurate and dibutyltin oxide, are employed.

The employment of tin-containing catalysts is to be avoided in coating materials, as elsewhere, because of the toxicity inherent in many tin compounds. The EU Commission's Working Group on Classification and Labelling" have categorized dibutyltin oxide (DBTO) and dibutyltin dilaurate (DBTL) accordingly.

The article available on the Internet at the address www-.wernerblank.com and titled "Catalysis of the Isocyanate-Hydroxyl Reaction by Non-Tin Catalysts", by Werner J. Blank, Z. A. He, and Ed. T. Hessell of the company King Industries Inc., therefore describes alternatives to the typical tin-containing catalysts based on various metal salts and metal complexes, such as zirconium chelates, aluminum chelate, and bismuth carboxylate.

DE 10 2008 061 329 A1 discloses coating materials where the use of metal-containing catalysts is to be avoided as far as possible and which instead as catalyst comprise 1,3 substituted imidazolium salts for the deblocking of blocked polyisocyanates in polyurethane coating materials.

WO04/029121 describes polyurethane compositions which are stabilized in terms of the reactivity of the composition by addition of acids with a pKa range between 2.8 and 4.5, these acids being able to be utilized at the same time as catalyst. Acids used in this context and with a pKa range between 2.8 and 4.5 include, for example, benzoic acid, hydroxybenzoic acid, salicylic acid, phthalic acid, and so on. The compositions preferably comprise no further catalyst, although in addition it is also possible to use the typical known polyurethane catalysts, such as tertiary amines or amidines or organometallic compounds, such as tin compounds more particularly. Where amines are used as catalyst, it is necessary to employ great care in the selection of the type of amine and its amount, since the aminic catalysts are able in part to eliminate the stabilizing action of the organic acids added.

U.S. Pat. No. 5,847,044 describes polyurethane powder coating materials which as catalysts comprise N,N,N'-trisubstituted amidines, more particularly bicyclic amidines.

WO 09/135,600 describes polyurethane compositions, more particularly sealants, adhesives, and foams, which comprise as catalyst the reaction product of a metal salt with nitrogen-containing, heterocyclic compounds, more particularly substituted imidazoles.

DE-A-24 34 185 describes a process for preparing amidine-metal complexes and their use as catalysts for the isocyanate polyaddition reaction. These amidine-metal complexes are prepared by reacting an amidine with a 0.5- to 4-fold molar amount of a metal compound, the amidines used comprising not only monocyclic and/or bicyclic compounds, such as imidazoles more particularly, but also acyclic compounds, such as formamidines, acetamidines, benzamidines, and guanidines. Metal compounds used are those of trivalent iron, of divalent nickel, of divalent zinc, of divalent manganese, of divalent tin or of tetravalent tin, with the corresponding carboxylates being employed more particularly.

Lastly, U.S. Pat. No. 7,485,729 B2 and also the equivalent specifications WO06/022899, US 2006/0247341 A1, and US 2009/0011124 A1, describe organometallic compounds and coating materials comprising them. Coating materials described are powder coating materials based on hydroxyl-containing polyacrylates and/or polyesters and on uretdione-containing polyisocyanates, liquid coating materials based on hydroxyl-containing polyacrylates and/or polyesters and on blocked polyisocyanates, and also solventborne coating materials based on epoxy/carboxy or epoxy/anhydride components. The organometallic compounds used as catalyst, besides other metal-amine complexes, are cyclic or acyclic zinc biscarboxylate-bisamidine complexes, such as Zn(1,1,3,3-tetramethylguanidine)$_2$(2-ethylhexanoate)$_2$, for example.

A problem addressed by the present invention, therefore, was that of providing coating material compositions, more particularly for automotive refinish and for the coating of utility vehicles, that ensure good assembly strength after just a very short time, meaning that they ought to ensure rapid curing even under the conditions of refinish and of the finishing of utility vehicles, in other words ought after curing at 60° C. for 30 minutes already to have undergone curing to an extent such that initial assembly operations or demasking operations can be carried out without damage to the coating. At the same time, however, the coating material compositions ought, at room temperature and after mixing of the binder component with the isocyanate component, to have a good potlife of at least 2 hours. Potlife here means the period of time within which the coating material composition has attained twice its initial viscosity. Moreover, the coating material compositions ought to lead to coatings exhibiting good through-curing and sufficient ultimate hardness. Furthermore, these coating material compositions ought not to show any changes in color before and after curing. Particularly in the field of clearcoat materials in the automotive industry, the intrinsic color of the systems is subject to exacting requirements. Thus the catalyst neither must exhibit any intrinsic color and nor must it lead to discoloring at mixing or during curing of the coating material when the catalyst is mixed with the typical components of a coating material.

Furthermore, the catalyst ought to be able to be added to the coating system from the outset. However, admixing the catalyst to the coating systems from the outset is not to cause any adverse effect on the shelflife of the coating composition. Furthermore, the catalyst ought to be insensitive to hydrolysis, since even in systems in organic solution, the typically high concentration of hydroxyl groups can result in a reduction in catalyst activity over the storage period. Especially in the automotive refinish segment, an extremely long shelflife even at relatively high temperatures is an advantage.

Lastly, the coating material compositions ought to be able to be prepared simply and with very good reproducibility, and ought not to cause any environmental problems during application. More particularly, catalysts containing tin ought to be avoided or at best be entirely dispensable.

SUMMARY OF THE INVENTION

In the light of the addressed problem set out above, a coating material composition has been found comprising at least one polyhydroxyl group-containing compound (A), at least one polyisocyanate group-containing compound (B) having free and/or blocked isocyanate groups, at least one catalyst (D) based on a zinc-amidine complex which is preparable by reaction of 1.0 moles of one or more zinc(II) biscarboxylates with more than 2.0 moles of an amidine of the formula (I) or with more than 2.0 moles of a mixture of two or more amidines of the formula (I)

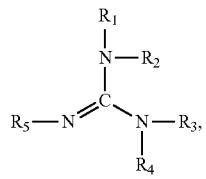

where $R_5$=hydrogen and $R_1$, $R_2$, $R_3$, and $R_4$ are each identical or different radicals, $R_1$ and $R_3$ being hydrogen or an alkyl radical or an aryl radical, and $R_2$ and $R_4$ being an alkyl radical or an aryl radical,
and
at least one monomeric aromatic, optionally substituted carboxylic acid (S) whose carboxyl group is in conjugation with a π-electron system.

The present invention additionally provides multistage coating methods using these coating material compositions, and also the use of the coating material compositions as clearcoat material, and application of the coating method for automotive refinish and/or for the coating of plastics substrates and/or of utility vehicles.

DETAILED DESCRIPTION OF AN EMBODIMENT OF THE INVENTION

It is surprising and was not foreseeable that the coating material compositions ensure good assembly strength after just a very short time under the conditions for automotive refinish, in other words they ensure rapid curing even under the conditions of refinish, thus being already tack-free after curing at 60° C. for 15 minutes. At the same time, at room temperature and after mixing of the binder component with the isocyanate component, however, the coating material compositions exhibit a good potlife of at least 2 hours. By potlife here is meant the period of time within which the coating material composition has attained twice its initial viscosity.

Moreover, the coating material compositions lead to coatings having good through-curing and a sufficient ultimate hardness. Furthermore, the catalyst neither exhibits an inherent color nor does it lead to a discoloration with the conventional coating components while mixing or curing the coating material.

Furthermore, the catalyst can be added to the coating system from the outset without adversely affecting the shelflife of the coating material compositions. Furthermore, the catalyst is insensitive to hydrolysis, and so the typically high concentration of hydroxyl groups does not result in any reduction in the catalyst activity over the storage period, even in systems in organic solution, and this is an advantage especially in the automotive refinish segment.

Lastly, the coating material compositions can be prepared easily and with very good reproducibility, and do not cause any environmental problems during application. In particular, tin catalysts can be avoided and at best are in fact entirely dispensable.

The Polyhydroxyl Group-Containing Compound (A)

As polyhydroxyl group-containing compound (A) it is possible to use all compounds known to the skilled person which have at least 2 hydroxyl groups per molecule and are oligomeric and/or polymeric. As component (A) it is also possible to use mixtures of different oligomeric and/or polymeric polyols.

The preferred oligomeric and/or polymeric polyols (A) have mass-average molecular weights Mw>500 daltons, measured by means of gel permeation chromatography (GPC) against a polystyrene standard, preferably between 800 and 100 000 daltons, more particularly between 1000 and 50 000 daltons.

Particularly preferred are polyester polyols, polyurethane polyols, polysiloxane polyols, polyacrylate polyols and/or polymethacrylate polyols, and also copolymers thereof, referred to below as polyacrylate polyols.

The polyols preferably have an OH number of 30 to 400 mg KOH/g, more particularly between 100 and 300 KOH/g. The hydroxyl number (OH number) indicates the number of mg of potassium hydroxide that are equivalent to the amount of acetic acid bound by 1 g of substance on acetylation. For the determination, the sample is boiled with acetic anhydride-pyridine and the resultant acid is titrated with potassium hydroxide solution (DIN 53240-2). In the case of pure poly (meth)acrylates, the OH number may also be determined with sufficient accuracy by calculation on the basis of the OH-functional monomers used.

The glass transition temperatures, measured by means of DSC measurement in accordance with DIN EN ISO 11357-2, of the polyols are preferably between −150 and 100° C., more preferably between −120° C. and 80° C.

Suitable polyester polyols are described in EP-A-0 994 117 and EP-A-1 273 640, for example. Polyurethane polyols are prepared preferably by reaction of polyester polyol prepolymers with suitable di- or polyisocyanates, and are described in EP-A-1 273 640, for example. Suitable polysiloxane polyols are described in WO-A-01/09260, for example, and the polysiloxane polyols recited therein may be employed preferably in combination with other polyols, more particularly those having higher glass transition temperatures.

With very particular preference, component (A) comprises one or more polyacrylate polyols and/or polymethacrylate polyols. Together with the polyacrylate polyol(s) and/or polymethacrylate polyol(s) it is possible for other oligomeric and/or polymeric polyhydroxyl group-containing compounds to be employed, examples being polyester polyols, polyurethane polyols, and polysiloxane polyols, especially polyester polyols.

The poly(meth)acrylate polyols that are especially preferred in accordance with the invention are generally copolymers and preferably have mass-average molecular weights Mw of between 1000 and 20 000 daltons, more particularly between 1500 and 10 000 daltons, in each case measured by means of gel permeation chromatography (GPC) against a polystyrene standard.

The glass transition temperature of the copolymers is generally between −100 and 100° C., more particularly between −50 and 80° C. (measured by means of DSC measurements in accordance with DIN-EN-ISO 11357-2).

The poly(meth)acrylate polyols preferably have an OH number of 60 to 250 mg KOH/g, more particularly between 70 and 200 KOH/g, and also an acid number of between 0 and 30 mg KOH/g.

The hydroxyl number (OH number) is determined as described above (DIN 53240-2). The acid number here indicates the number of mg of potassium hydroxide consumed for the neutralization of 1 g of the compound in question (DIN EN ISO 2114).

As hydroxyl-containing monomer building blocks it is preferred to use hydroxyalkyl acrylates and/or hydroxyalkyl methacrylates, such as more particularly 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, and, in particular, 4-hydroxybutyl acrylate and/or 4-hydroxybutyl methacrylate.

As further monomer building blocks for the poly(meth)acrylate polyols it is preferred to use alkyl acrylates and/or alkyl methacrylates, such as preferably ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate or, in particular, cyclohexyl acrylate and/or cyclohexyl methacrylate.

As further monomer building blocks for the poly(meth)acrylate polyols it is possible to use vinylaromatic hydrocarbons, such as vinyltoluene, alpha-methylstyrene or, in particular, styrene, amides or nitriles of acrylic or methacrylic acid, vinyl esters or vinyl ethers, and also, in minor amounts, in particular, acrylic and/or methacrylic acid.

The Polyisocyanate Group-Containing Compounds (B)

Suitable as component (B) are substituted or unsubstituted aromatic, aliphatic, cycloaliphatic and/or heterocyclic polyisocyanates that are known per se. Examples of preferred polyisocyanates are as follows: 2,4-toluene diisocyanate, 2,6-toluene diisocyanate, diphenylmethane 4,4'-diisocyanate, diphenylmethane 2,4'-diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenyl-methane 2,4'-diisocyanate, 4,4'-methylenedicyclohexyl diisocyanate (e.g. Desmodur® W from Bayer AG), tetramethylxylyl diisocyanates (e.g., TMXDI® from American Cyanamid), and mixtures of the aforementioned polyisocyanates. Preferred polyisocyanates are also the biuret dimers and the isocyanurate trimers of the aforementioned diisocyanates. Particularly preferred polyisocyanates (B) are hexamethylene 1,6-diisocyanate, isophorone diisocyanate, and 4,4'-methylenedicyclohexyl diisocyanate, their biuret dimers and/or their isocyanurate trimers and/or their asymmetrical trimers, such as, for example, the asymmetrical HDI trimer available commercially under the name Desmodur® N390.

In another embodiment of the invention, the polyisocyanates are polyisocyanate prepolymers having urethane structural units, which are obtained by reaction of polyols with a stoichiometric excess of aforementioned polyisocyanates. Polyisocyanate prepolymers of this kind are described in U.S. Pat. No. 4,598,131, for example.

The polyisocyanate group-containing component (B) may be present in a suitable solvent (L). Suitable solvents (L) are those which allow a sufficient solubility of the polyisocyanate component and are free from isocyanate-reactive groups. Examples of such solvents are acetone, methyl ethyl ketone, cyclohexanone, methyl isobutyl ketone, methyl isoamyl ketone, diisobutyl ketone, ethyl acetate, n-butyl acetate, ethylene glycol diacetate, butyrolactone, diethyl carbonate, propylene carbonate, ethylene carbonate, N,N-dimethylformamide, N,N-dimethylacetamide, N-methyl-pyrrolidone, N-ethylpyrrolidone, methylal, butylal, 1,3-dioxolane, glycerol formal, benzene, toluene, xylene, n-hexane, cyclohexane, Solventnaphtha®, 2-methoxypropyl acetate (MPA), and ethyl ethoxypropionate.

Hydroxyl-Containing Compounds (C)

Optionally, in addition to the polyhydroxyl group-containing component (A), the coating material compositions of the invention may further comprise one or more monomeric, hydroxyl-containing compounds (C), different from component (A). These compounds (C) preferably occupy a fraction of 0% to 20% by weight, more preferably of 1% to 10% by weight, very preferably of 1% to 5% by weight, based in each case on the binder content of the coating material composition.

As hydroxyl group-containing compound (C), use is made of low molecular mass polyols.

Low molecular mass polyols used are, for example, diols, such as preferably ethylene glycol, neopentyl glycol, 1,2-propanediol, 2,2-dimethyl-1,3-propanediol, 1,4-butanediol, 1,3-butanediol, 1,5-pentanediol, 2,2,4-tri-methyl-1,3-pentanediol, 1,6-hexanediol, 1,4-cyclohexanedimethanol and 1,2-cyclohexanedimethanol, and also polyols, such as preferably trimethylolethane, trimethylolpropane, trimethylolhexane, 1,2,4-butanetriol, pentaerythritol, and dipentaerythritol. Preference is given to admixing low molecular mass polyols of this kind in minor fractions to the polyol component (A).

Catalyst (D)

It is essential to the invention that the coating material composition comprises at least one catalyst (D) based on a zinc-amidine complex which is preparable by reaction of 1.0 moles of one or more zinc(II) biscarboxylates with more than 2.0 moles of an amidine of the formula (I) or with more than 2.0 moles of a mixture of two or more amidines of the formula (I)

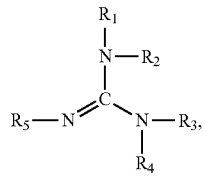

where $R_5$=hydrogen and $R_1$, $R_2$, $R_3$, and $R_4$ are each identical or different radicals, $R_1$ and $R_3$ being hydrogen or an alkyl radical or an aryl radical, and $R_2$ and $R_4$ being an alkyl radical or an aryl radical.

The zinc-amidine complex is preferably either preparable by reaction of 1.0 moles of one or more zinc(II) biscarboxylates with at least 2.5, more preferably with at least 3.0, and very preferably with 3.0 to 4.0 moles of an amidine of the formula (I), or preparable by reaction of 1.0 moles of one or more zinc(II) biscarboxylates with at least 2.5, more preferably with at least 3.0, and very preferably with 3.0 to 4.0 moles of a mixture of two or more amidines of the formula (I).

With particular preference the catalyst (D) is preparable by reaction of 1.0 moles of a zinc(II) biscarboxylate with at least 2.5, more preferably with at least 3.0, and very preferably with 3.0 to 4.0 moles of an amidine of the formula (I).

The radicals $R_2$ and $R_4$ are preferably identical or different acyclic, straight-chain or branched alkyl radicals and/or identical or different aryl radicals. Preferably, the radicals $R_1$ and $R_3$ are hydrogen or identical or different acyclic, straight-chain or branched alkyl radicals and/or identical or different aryl radicals. The alkyl radicals may in each case optionally be present as esters, ethers, ether esters, and ketones. The aryl radicals may be substituted by aliphatic esters, ethers, ether esters, and ketones, or be present as aromatic esters, ethers, ether esters, and ketones.

More preferably, the radicals $R_1$, $R_2$, $R_3$, and $R_4$ are each identical or different acyclic aliphatic radicals, and very preferably these radicals $R_1$, $R_2$, $R_3$, and $R_4$ have one to four carbon atoms. With particular preference the radicals $R_1$, $R_2$, $R_3$, and $R_4$ are methyl radicals.

Preferred zinc-amidine complexes (D) are additionally those in which the carboxylate radical of the zinc-amidine complex (D) is selected from the group of the carboxylate radicals of aliphatic linear and/or branched, optionally substituted monocarboxylic acids having 1 to 12 C atoms in the alkyl radical and/or of aromatic, optionally substituted monocarboxylic acids having 6 to 12 C atoms in the aryl radical. The carboxylate radical largely determines the solubility of the resultant complex in the coating components used. With very particular preference, therefore, the complexes used in the coating material compositions of the invention are zinc-amidine complexes which are obtainable by reaction of 1.0 moles of zinc(II) bis(2-ethylhexanoate) with 3.0 to 4.0 moles of an amidine(I).

Particular preference is given to coating material compositions which comprise as component (D) $Zn(1,1,3,3$-tetramethylguanidine$)_x$(acetate$)_2$, $Zn(1,1,3,3$-tetramethylguanidine$)_x$(formate$)_2$, $Zn(1,1,3,3$-tetramethylguanidine$)_x$(benzoate$)_2$, $Zn(1,1,3,3$-tetramethylguanidine$)_x$(2-ethylhexanoate$)_2$, $Zn(1,1,3,3$-tetramethylguanidine$)_x$(octoate$)_2$, $Zn(1,3$-diphenyl-guanidine$)_x$(formate$)_2$, $Zn(1,3$-diphenylguanidine$)_x$(acetate$)_2$, $Zn(1,3$-di-phenylguanidine$)_x$(benzoate$)_2$, $Zn(1,3$-diphenylguanidine$)_x$(2-ethyl-hexanoate$)_2$, and/or $Zn(1,3$-diphenylguanidine$)_x$(octoate$)_2$, preferably $Zn(1,1,3,3$-tetramethylguanidine$)_x$(2-ethylhexanoate$)_2$ and/or $Zn(1,1,3,3$-tetramethylguanidine$)_x$(octoate$)_2$ and/or $Zn(1,3$-diphenylguanidine$)_x$(2-ethylhexanoate$)_2$ and/or $Zn(1,3$-diphenylguanidine$)_x$(octoate$)_2$ with x, in each case, being greater than or equal to 2.5, in particular x=3.0 to 4.0. Especially preferred are coating material compositions which comprise as component (D) $Zn(1,1,3,3$-tetramethylguanidine$)_x$(2-ethylhexanoate$)_2$ and/or $Zn(1,1,3,3$-tetramethylguanidine$)_x$(octoate$)_2$ with x, in each case, being greater than or equal to 2.5, in particular x=3.0 to 4.0.

The reaction of the zinc(II) biscarboxylate or biscarboxylates with the amidine or amidines (I) takes place typically in a solvent. Solvents employed in this case are more particularly those solvents which allow sufficient solubility of the zinc(II) biscarboxylates and of the zinc-amidines and are free from isocyanate-reactive groups. Examples of such solvents are the solvents (L) already recited in connection with the polyisocyanate group-containing compound (B).

The reaction of the zinc(II) biscarboxylate or biscarboxylates with the amidine or amidines (I) may also take place in the polyhydroxyl group-containing component (A) and/or in the low molecular mass alcohols recited as component (C), optionally in a mixture with further solvents—such as, more particularly, the solvents (L) just recited.

It is also possible to carry out the reaction of the zinc(II) biscarboxylate or biscarboxylates with the amidine or amidines (I) in the overall mixture of the coatings component (K-I), comprising the hydroxyl group-containing compounds (A) and optionally (C), optionally the solvent, and optionally one or more of the coatings additives (F) recited below.

The reaction of the zinc(II) biscarboxylate or biscarboxylates with the amidine or amidines (I) takes place typically at room temperature or slightly elevated temperature of up to 100° C. For this reaction, generally speaking, the zinc(II) biscarboxylate is introduced in the solvent or in the hydroxyl group-containing compound (A) and/or (C)— as just described—and the amidine compound, optionally in solution in one of the stated solvents, is added slowly dropwise. After waiting for the resultant evolution of heat, the mixture is then stirred for 2 hours more at not less than 60° C.

In addition it is possible, particularly when the coating material compositions are 2-component coating material compositions, to prepare the active catalyst compound (D) in situ. For this purpose, a corresponding amount of the amidine or amidines is dissolved in the coatings component (K-I), comprising hydroxyl-containing binder (A) and optionally (C), and a corresponding amount of the zinc(II) biscarboxylate is dissolved in the coatings component (K-II), comprising the polyisocyanate group-containing compound (B). When the two coatings components are mixed prior to application, the zinc-amidine complex is then formed in situ in the coating material composition.

Monomeric Aromatic Carboxylic Acid (S)

It is further essential to the invention that the coating material composition comprises at least one monomeric aromatic, optionally substituted carboxylic acid (S) whose carboxyl group is in conjugation with a π-electron system. Here, the number of carboxyl groups may vary, the carboxylic acids preferably having one carboxyl group. The monomeric aromatic, optionally substituted carboxylic acids preferably have a molecular weight <500 g/mol, more preferably <300 g/mol. It is preferred to use monomeric aromatic, optionally substituted carboxylic acids which have a pKa of 2 to 5. The pKa corresponds to the pH at the half-equivalent point, the solution medium being preferably water. Should it not be possible for an acid to specify a pKa in water, then the medium selected is preferably DMSO or else another suitable medium in which the acid is soluble.

Suitability is possessed by monomeric aromatic monocarboxylic and polycarboxylic acids, the corresponding alkyl- and aryl-substituted aromatic monocarboxylic and polycarboxylic acids, and also the corresponding hydroxyl-containing aromatic monocarboxylic and polycarboxylic acids, such as, for example, phthalic acid and terephthalic acid, alkyl- and/or aryl-substituted phthalic acid and terephthalic acid, benzoic acid and alkyl- and/or aryl-substituted benzoic acid, aromatic carboxylic acids having further functional groups such as salicylic acid and acetylsalicylic acid, alkyl- and/or aryl-substituted salicylic acid or isomers thereof, polycyclic aromatic carboxylic acids, such as the isomers of naphthalenecarboxylic acid, and derivatives thereof.

As monomeric aromatic carboxylic acid (S), the coating material composition preferably comprises benzoic acid, tert-butylbenzoic acid, 3,4-dihydroxybenzoic acid, salicylic acid and/or acetylsalicylic acid, more preferably benzoic acid.

The Combination of Components (A), (B), Optionally (C), (D), and (S), and Also Further Components of the Coating Material Compositions Where the compositions are one-component coating material compositions, polyisocyanate group-containing compounds (B) are selected whose free isocyanate groups are blocked with blocking agents. For example, the isocyanate groups may be blocked with substituted pyrazoles, more particularly with alkyl-substituted pyrazoles, such as 3-methylpyrazole, 3,5-dimethylpyrazole, 4-nitro-3,5-dimethylpyrazole, 4-bromo-3,5-dimethylpyrazole, and so on. With particular preference, the isocyanate groups of component (B) are blocked with 3,5-dimethylpyrazole.

In the case of the 2-component (2K) coating material compositions, which are particularly preferred in accordance with the invention, a coatings component comprising the polyhydroxyl group-containing compound (A) and also further components, described below, is mixed shortly before application of the coating material with a further coatings component, comprising the polyisocyanate group-containing compound (B) and also, optionally, other of the components described below, mixing taking place in a manner known per se; in general, the coatings component which comprises the compound (A) comprises the catalyst (D) and also a part of the solvent.

The polyhydroxy component (A) may be present in a suitable solvent. Suitable solvents are those which allow sufficient solubility of the polyhydroxy component. Examples of such solvents are the solvents (L) already cited in connection with the polyisocyanate group-containing compound (B).

The weight fractions of the polyol (A) and optionally (C) and of the polyisocyanate (B) are preferably selected such that the molar equivalents ratio of the hydroxyl groups of the polyhydroxyl group-containing compound (A) plus optionally (C) to the isocyanate groups of component (B) is between 1:0.9 and 1:1.5, preferably between 1:0.9 and 1:1.1, more preferably between 1:0.95 and 1:1.05.

It is preferred in accordance with the invention to use coating material compositions which comprise from 30% to 80% by weight, preferably from 50% to 70% by weight, based in each case on the binder content of the coating material composition, of at least one polyhydroxyl group-containing compound (A), more particularly at least one polyhydroxyl group-containing polyacrylate (A) and/or at least one polyhydroxyl group-containing polymethacrylate (A).

Preference is likewise given in accordance with the invention to the use of coating material compositions which comprise from 5% to 50% by weight, preferably from 25% to 40% by weight, based in each case on the binder content of the coating material composition, of the polyisocyanate group-containing compound (B).

The coating material compositions of the invention preferably further comprise at least one zinc-amidine complex (D) in an amount such that the metal content of the zinc-amidine complex, based in each case on the binder content of the coating material composition, is between 35 and 2000 ppm, preferably between 35 and 1000 ppm, and more preferably between 100 and 1000 ppm.

The coating material compositions of the invention preferably further comprise 0.2% to 15.0% by weight, preferably 0.5% to 8.0% by weight, and more preferably 0.5% to 5.0% by weight, of at least one aromatic carboxylic acid (S), the percentages by weight being based in each case on the binder content of the coating material composition.

By binder fraction is meant in each case the fraction of the coating material composition, prior to crosslinking, which is soluble in tetrahydrofuran (THF). For this purpose, a small sample (P) is weighed out and dissolved in 50 to 100 times the amount of THF, insoluble constituents are removed by filtration, the THF is evaporated off, and subsequently the solids of the previously THF-dissolved constituents is ascertained by drying the remaining sample at 130° C. for 60 minutes, cooling it in a desiccator, and then weighing it again. The residue corresponds to the binder content of the sample (P).

The coating material compositions of the invention are preferably nonaqueous coating materials and may comprise solvent or may be formulated as solvent-free systems. Examples of suitable solvents are the solvents (L) already recited for the polyhydroxyl group-containing compound (A) and optionally (C) and for the polyisocyanate group-containing compound (B). The solvent or solvents are used in the coating material compositions of the invention preferably in an amount such that the solids content of the coating material composition is at least 50% by weight, more preferably at least 60% by weight.

Additionally, the coating material compositions of the invention may comprise 0% to 30% by weight, preferably 0% to 15% by weight, based in each case on the binder content of the coating material composition, of one or more amino resins and/or one or more tris(alkoxycarbonylamino)triazines (E).

Examples of suitable tris(alkoxycarbonylamino)triazines are given in U.S. Pat. No. 4,939,213, in U.S. Pat. No. 5,084,541, and in EP-A-0 624 577.

Examples of suitable amino resins (E) are all of the amino resins typically used in the coating industry sector, the properties of the resultant coating materials being controllable via the reactivity of the amino resin. The resins are condensation products of aldehydes, especially formaldehyde, and, for example, urea, melamine, guanamine, and benzoguanamine. The amino resins comprise alcohol groups, preferably methylol groups, generally some of which, or preferably all of which, are etherified with alcohols. Use is made in particular of amino resins etherified with lower alcohols. Preference is given to using amino resins etherified with methanol and/or ethanol and/or butanol, examples being the products available commercially under the names Cymel®, Resimene®, Maprenal®, and Luwipal®.

The amino resins (E) are long-established compounds and are described in detail in, for example, the American patent application US 2005/0182189 A1, page 1, paragraph [0014], to page 4, paragraph [0028].

The binder mixture of the invention and/or the coating material composition of the invention may further comprise at least one customary and known coatings additive (F) in effective amounts, i.e., in amounts preferably up to 30%, more preferably up to 25%, and more particularly up to 20%, by weight, based in each case on the binder content of the coating material composition.

Examples of suitable coatings additives (F) are as follows:
especially UV absorbers;
especially light stabilizers such as HALS compounds, benzotriazoles or oxalanilides;
free-radical scavengers;
slip additives;
polymerization inhibitors;
defoamers;
is reactive diluents different from components (A) and (C), more particularly reactive diluents which become reactive only through reaction with further constituents and/or with water, such as Incozol® or aspartic esters, for example;
wetting agents different from components (A) and (C), such as siloxanes, fluorine-containing compounds, carboxylic monoesters, phosphoric esters, polyacrylic acids and their copolymers, or polyurethanes;
adhesion promoters;
flow control agents;
film-forming assistants such as cellulose derivatives;
fillers such as, for example, nanoparticles based on silicon dioxide, aluminum oxide or zirconium oxide; for further details, refer to Römpp Lexikon "Lacke and Druckfarben", Georg Thieme Verlag, Stuttgart, 1998, pages 250 to 252;
rheology control additives different from components (A) and (C), such as the additives known from patents WO 94/22968, EP-A-0 276 501, EP-A-0 249 201 or WO 97/12945; crosslinked polymeric microparticles, of the kind disclosed in EP-A-0 008 127, for example; inorganic phyllosilicates such as aluminum magnesium silicates, sodium magnesium and sodium magnesium fluorine lithium phyllosilicates of the montmorillonite type; silicas such as Aerosils®; or synthetic polymers having ionic and/or associative groups, such as poly(meth)acylamide, poly(meth)acrylic acid, poly-vinylpyrrolidone, styrene-maleic anhydride or ethylene-maleic anhydride copolymers and their derivatives, or hydrophobically modified ethoxylated urethanes or polyacrylates;
flame retardants.

Particularly preferred are coating material compositions which comprise 50% to 70% by weight, based on the binder content of the coating material composition, of at least one polyhydroxyl group-containing polyacrylate (A) and/or at least one polyhydroxyl group-containing polymethacrylate (A), 25% to 40% by weight, based on the binder content of the coating material composition, of the polyisocyanate group-containing compound (B), 0% to 10% by weight, based on the binder content of the coating material composition, of the hydroxyl-containing component (C), 0.5% to 5.0% by weight, based on the binder content of the coating material composition, of at least one aromatic carboxylic acid (S), 0% to 15% by weight, based on the binder content of the coating material composition, of one or more amino resins and/or one or more tris(alkoxycarbonylamino)triazines (E), and 0% to 20% by weight, based on the binder content of the coating material composition, of at least one customary and known coatings additive (F) and comprise at least one zinc-amidine complex (D) in an amount such that the metal content of the zinc-amidine complex, based in each case on the binder content of the coating material composition, is between 100 and 1000 ppm.

In a further embodiment of the invention, the binder mixture or coating material composition of the invention may further comprise other pigments and/or fillers and may serve for producing pigmented topcoats and/or pigmented undercoats or primer-surfacers, more particularly pigmented topcoats. The pigments and/or fillers that are used for these purposes are known to the skilled person. The pigments are typically used in an amount such that the pigment-to-binder ratio is between 0.05:1 and 1.5:1, based in each case on the binder content of the coating material composition.

Since the coatings of the invention produced from the coating materials of the invention also adhere outstandingly to already-cured electrocoat finishes, surfacer finishes, basecoat finishes or customary and known clearcoat finishes, they are outstandingly suitable not only for use in automotive OEM (production-line) finishing but also for automotive refinish and/or for the coating of parts for installation in or on automobiles and/or for the coating of utility vehicles.

The coating material compositions of the invention may be applied by all of the customary application methods, such as spraying, knifecoating, spreading, pouring, dipping, impregnating, trickling or rolling, for example. In the course of such application, the substrate to be coated may itself be at rest, with the application equipment or system being moved. Alternatively, the substrate to be coated, more particularly a coil, may be moved, with the application system being at rest relative to the substrate or being moved appropriately.

Preference is given to employing spray application methods, such as, for example, compressed-air spraying, airless spraying, high-speed rotation, electrostatic spray application (ESTA), alone or in conjunction with hot spray application such as, for example, hot-air spraying.

The applied coating materials of the invention can be cured after a certain rest time. The rest time serves, for example, for the flow and devolatization of the coating films or for the evaporation of volatile constituents such as solvents. The rest time may be assisted and/or shortened by use of elevated temperatures and/or by a reduced atmospheric humidity, provided that this does not entail any damage to or change in the coating films, such as premature complete crosslinking, for instance.

There are no peculiarities of method as far as the thermal curing of the coating materials is concerned; this curing instead takes place in accordance with the customary and known methods such as heating in a forced-air oven or irradiation with IR lamps. Thermal curing here may also take place in stages. Another preferred method of curing is that using near infrared (NIR radiation).

Thermal curing takes place advantageously at a temperature of 20 to 200° C. for a time of 1 minute up to 10 hours, and even longer cure times may be employed at low temperatures. For automotive refinish and for the painting of plastics parts, and also for the finishing of utility vehicles, it is usual to employ relatively low temperatures, which are preferably between 20 and 80° C., more particularly between 20 and 60° C.

The coating material compositions of the invention are outstandingly suitable for use as decorative, protective and/or effect coatings and finishes on bodywork of means of transport (more particularly motor vehicles, such as cycles, motorcycles, buses, trucks or automobiles) or of parts thereof; of the interior and exterior of edifices; of furniture, windows, and doors; of plastics moldings, more particularly CDs and windows; of small industrial parts, of coils, containers, and packaging; of white goods; of films; of optical, electrical, and mechanical components; and also of hollow glassware and articles of everyday use.

Consequently, the coating material compositions of the invention can be applied, for example, to an uncoated or precoated substrate, the coating materials of the invention being either pigmented or unpigmented. The coating material compositions and finishes of the invention, more particularly the clearcoat finishes, are employed more particularly in the technologically and esthetically particularly demanding field of automotive OEM finishing and for the coating of plastics parts for installation in or on automobile bodies, more particularly for top-class automobile bodies, such as, for example, for producing roofs, tailgates, engine cowlings, fenders, bumpers, spoilers, sills, protective strips, side trim, and so on, and also for automotive refinish and for the finishing of utility vehicles, such as, for example, of trucks, chain-driven construction vehicles, such as crane vehicles, wheel loaders, and concrete mixers, buses, rail vehicles, watercraft, aircraft, and also agricultural equipment such as tractors and combines, and parts thereof.

The plastics parts are typically composed of ASA, polycarbonates, blends of ASA and polycarbonates, polypropylene, polymethyl methacrylates or impact-modified polymethyl methacrylates, more particularly of blends of ASA and polycarbonates, preferably used with a polycarbonate fraction >40%, more particularly >50%.

ASA refers generally to impact-modified styrene-acrylonitrile polymers wherein graft copolymers of vinylaromatic compounds, more particularly styrene, and of vinyl cyanides, more particularly acrylonitrile, are present on polyalkyl acrylate rubbers in a copolymer matrix of, in particular, styrene and acrylonitrile.

With particular preference the coating material compositions of the invention are used in multistage coating methods, more particularly in methods which involve applying, to an uncoated or precoated substrate, first a pigmented basecoat film and thereafter a coat with the coating material composition of the invention. The invention accordingly also provides multicoat effect and/or color coating systems comprising at least one pigmented basecoat film and, disposed thereon, at least one clearcoat film, characterized in that the clearcoat film has been produced from the coating material composition of the invention.

Not only water-thinnable basecoats but also basecoats based on organic solvents may be used. Suitable basecoats are described in, for example, EP-A-0 692 007 and the documents cited therein at column 3, lines 50 et seq. Preferably, the applied basecoat is first dried, which means that, in an evaporation phase, at least some of the organic solvent and/or the water is removed from the basecoat film. Drying takes place preferably at temperatures from room temperature to 80° C. After drying has taken place, the coating material composition of the invention is applied. The two-coat finish is then preferably baked, under conditions employed in automotive OEM finishing, at temperatures from 20 to 200° C. for a time from 1 minute up to 10 hours, and even longer cure times may be employed in the case of the temperatures employed for automotive refinish, which are generally between 20 and 80° C., more particularly between 20 and 60° C.

In another preferred embodiment of the invention, the coating material composition of the invention is used as a transparent clearcoat for the coating of plastics substrates, more particularly of plastics parts for installation in or on other articles. These plastics parts are preferably likewise coated in a multistage coating method, which involves applying, to an uncoated or precoated substrate or to a substrate which has been pretreated for improved adhesion of the subsequent coatings (for example, by flaming, corona treatment or plasma treatment of the substrate), first a pigmented basecoat film and thereafter a coat with the coating material composition of the invention.

EXAMPLES

Gel Permeation Chromatography (GPC)

The gel permeation chromatography was carried out at 40° C. using a high-pressure liquid chromatography pump and a refractive-index detector. The eluent used was tetrahydrofuran, with an elution rate of 1 ml/min. The calibration was carried out by means of polystyrene standards. The number-average molecular weight Mn, the weight-average molecular weight Mw, and Mp were ascertained, the polydispersity index Mp being calculated from Mp=Mw/Mn.

Hydroxyl Number:

The hydroxyl number is calculated via the fraction of OH-functional components used and expressed in mg of KOH per gram of resin solids.

Solids Determination

Approximately 1 g of sample are weighed out into a tin plate lid. Following addition of around 3 ml of butyl acetate, the sample is dried in a drying cabinet at 130° C. for 60 minutes, cooled in a desiccator, and then weighed again. The residue corresponds to the solids fraction.

Binder Content Determination

The binder fraction means in each case that fraction of the coating material composition that is soluble in tetrahydrofuran (THF), prior to crosslinking. For its determination, a small sample (P) is weighed out, dissolved in 50 to 100 times the amount of THF, insoluble constituents are removed by filtration, the THF is evaporated off, and then the solids of the constituents previously dissolved in THF is ascertained by drying at 130° C. for 60 minutes, cooling in a desiccator, and then repeat weighing. The residue corresponds to the binder content of the sample (P).

Freedom from Tack by the Zapon Tack Test (ZTT):

An aluminum strip with a thickness of 0.5 mm, a width of 2.5 cm, and a length of 11 cm is bent at an angle of 110° to give a surface measuring 2.5×2.5 cm. The long side of the metal plate is bent, after a further 2.5 cm, by about 15°, so that the plate is just held in balance by a weight (5 g) placed in the center of the square area. For the measurement of the ZTT tack-free state, the bent plate is placed on the coating film and weighed down with a 100 g weight for 30 seconds. Following removal of the weight, the coating is considered tack-free if the metal angle falls over within 5 s. The test is repeated at intervals of 15 minutes. Before the test is deployed, the tackiness of the coating film is assessed qualitatively by touch. In the case of tests at elevated temperature, the test panels are stored at room temperature for 10 minutes for cooling before the test is commenced.

Print Test:

The coating film is drawn down using a 100 micrometer applicator onto a glass plate. After drying at 60° C. for 15 minutes, the glass plate, within a period of 10 minutes following removal from the oven, is placed on a commercial laboratory balance. Using thumb pressure, the film is then loaded with a weight of 2 kg for 20 seconds. This test is repeated every 10 minutes. In the case of a coating film which is obviously still soft or tacky, the coating film is first left until it has reached a sufficient freedom from tack, and a sufficient hardness. The tests are evaluated after a storage time of 24 hours. For the evaluation, the surface of the coating is washed off with aqueous surfactant solution (commercial washing-up detergent) and a soft cloth, in order to remove grease marks. Measurement is always against a standard. The coating is considered satisfactory if there is no visible thumb imprint on the coating film. This test is a measure of the assembly strength of refinishes—the earlier that the coating film has attained its assembly strength after forced drying, the earlier that assembly operations (or disassembly operations to remove adhesive masking) may be commenced on the refinished bodywork.

Drying Recorder:

The coating is drawn down using a 100 micrometer four-way bar applicator onto glass plates with dimensions of 280 mm×25 mm. With the aid of the Byk Dry-time Recorder, needles are drawn over the film at a defined speed, at room temperature (20-23° C.) and a relative humidity of 40% to 60%. Assessments are made of 3 different phases and also of the total length (i.e., sum of phase 1+phase 2+phase 3) of the track.

Phase 1: the needle track closes up again
Phase 2: the needle track results in a deep furrow in the coating film
Phase 3: the needle causes only superficial damage to the film The assessment is always undertaken against a standard.

Potlife:

For this, the viscosity of a paint sample is measured at room temperature in the DIN4 flow cup. Beforehand, the sample is adjusted to a flow viscosity of 19-20 seconds in the DIN4 cup. Thereafter, the increase in viscosity is determined at suitable time intervals. As soon as the sample has doubled its initial viscosity, the potlife limit is reached.

Pendulum Hardness:

The hardness of the paint films is determined by means of pendulum damping according to Koenig in accordance with DIN 53157. The pendulum strikes are reported.

Millbase:

86.4 g of a styrene-containing polyacrylate (62% in Solventnaphtha®/ethoxyethyl propionate/methyl isobutyl ketone (20/46/34)) having a molecular weight of 1600-2200 (Mn) and 4000-5000 (Mw), a measured acid number of 12-16 mg KOH/g, a calculated OH number (OHN) of about 130 mg KOH/g (resin solids), and a viscosity of the 60% strength solution in butyl acetate of 200-400 mPa·s, measured using a rotary viscometer (Brookfield CAP 2000, spindle 3, 1000 rpm), are stirred together with 6.4 g of methyl isobutyl ketone, 2.2 g of a commercial light stabilizer mixture composed of UV and HALS light stabilizers and also with 0.15 g of a commercial flow control agent based on a polyacrylate, to form a homogeneous mixture. Added to this mixture, where indicated, is the corresponding catalyst, which is mixed in with stirring. When benzoic acid is used, it is dissolved as a solid in the millbase mixture, with stirring. For adjustment of viscosity, a further 1.0 parts of methyl isobutyl ketone and 2.80 parts of butyl acetate are added.

Curing Agent Solution:

In a mixture of 5.17 parts of xylene, 7.48 parts of butyl acetate, 1.506 parts of ethyl ethoxypropionate, 7.03 parts of methyl isobutyl ketone, and 0.3 parts of a commercial flow control agent based on a polyacrylate (55% in Solventnaphtha®), 28.1 g of trimerized hexamethylene diisocyanate (HDI) containing isocyanurate groups and having an isocyanate content of 22.0%, based on the solvent-free trimerized hexamethylene diisocyanate, are dissolved.

Catalysts:

Catalyst K2

48.34 g of zinc(II) bis(2-ethylhexanoate) (0.137 mol) are dissolved in 20 g of butyl acetate. 31.656 g of 1,1,3,3-tetramethylguanidine (0.275 mol) are added slowly dropwise. After the exothermic reaction has subsided, stirring is continued at RT° C. for 20 minutes more.

Catalyst K3

40.36 g of zinc(II) bis(2-ethylhexanoate) (0.115 mol) are dissolved in 20.0 g of butyl acetate. 39.64 g of 1,1,3,3-tetramethylguanidine (0.344 mol) are added slowly dropwise. After the exothermic reaction has subsided, stirring is continued at RT° C. for 20 minutes more.

Catalyst K4

34.64 g of zinc(II) bis(2-ethylhexanoate) (0.1 mol) are dissolved in 20.0 g of butyl acetate. 45.36 g of 1,1,3,3-tetramethylguanidine (0.4 mol) are added slowly dropwise. After the exothermic reaction has subsided, stirring is continued at RT° C. for 20 minutes more.

Experimental Procedure:

Additional components such as benzoic acid and catalyst solutions are dissolved in the millbase. Following gentle stirring, clear solutions are obtained. For the implementation of the experiments, the millbase is introduced and the curing agent is added. The solution is homogenized by stirring. For the viscosity measurements, adjustment to the specified viscosity is made by addition of solvent. For the glass draw-downs, the viscosity adjustment is not made. For the drying test, the coating film is drawn down using a 100 μm four-way bar applicator onto glass plates to produce a film thickness of 30-35 μm. For the testing of the pendulum hardness, the film is poured onto glass plates, and before the Koenig film hardness is ascertained, the thickness of the applied film at the score mark (DIN 50933) is measured. For the tests using a drying recorder, the samples are likewise drawn down using a 100 μm four-way bar applicator onto suitable glass strips with length of approximately 300 mm and a width of approximately 25 mm; the film thicknesses achieved thereby are 30-35 μm.

Inventive Examples 1 and 2 and Comparative Examples C1 and C2

First of all, the coating materials of inventive examples 1 and 2 were prepared, with various zinc-amidine complexes but with the same amounts of benzoic acid. In addition, the corresponding coating materials were prepared in comparative examples C1 and C2 without any benzoic acid. The composition of these coating materials of inventive examples 1 and 2 and of comparative examples C1 and C2, and also the test results on the resultant coatings, are set out in table 1.

TABLE 1

Composition of the coating materials of inventive examples 1 and 2 and of comparative examples C1 and C2, and the test results of the resultant coatings

|  | I1 | I2 | C1 | C2 |
|---|---|---|---|---|
| Millbase | 98.97 | 98.97 | 98.97 | 98.97 |
| Benzoic acid | 2.43 | 2.43 |  |  |
| Catalyst K3 | 0.3 |  | 0.3 |  |
| Catalyst K4 |  | 0.35 |  | 0.35 |
| Curing agent solution | 49.85 | 49.85 | 49.85 | 49.85 |
| Metal content[1] [ppm] | 275 | 275 | 275 | 275 |

TABLE 1-continued

Composition of the coating materials of inventive examples 1 and 2 and of comparative examples C1 and C2, and the test results of the resultant coatings

|  | I1 | I2 | C1 | C2 |
|---|---|---|---|---|
| Potlife DIN 4 [s][2) | | | | |
| direct | 19 | 19 | 21 | 21 |
| after 1 h | 24 | 25 | 25 | 25 |
| after 2 h | 33 | 36 | 33 | 35 |
| after 3 h | 54 | 63 | 39 | 42 |
| ZAPON tack | | | | |
| 30 min 60° C./10 min RT [min][3) | 1 | 1 | 265 | 310 |
| 23° C. RT [min] | 380 | 380 | 480 | 480 |
| Pendulum damping | | | | |
| 23° C. RT after 1 d[4) | 95 | 83 | 72 | 72 |
| 23° C. RT after 7 d[4) | 133 | 117 | 135 | 137 |
| 30 min 60° C. after 1 d[5) | 96 | 113 | 94 | 98 |
| 30 min 60° C. after 7 d[5) | 141 | 144 | 146 | 147 |
| Drying Recorder[6) | | | | |
| Total length scratch track [cm] | 17.8 | 12.5 | 24.7 | 25 |
| Phase 1 [cm] | 6.7 | 5 | 6.5 | 6.5 |
| Phase 2 [cm] | 7.9 | 4.9 | 10.8 | 11.8 |
| Phase 3 [cm] | 3.2 | 2.6 | 7.4 | 6.7 |
| Print test-15 min 60° C.[7) [min] | 60 | 40 | 280 | 260 |

Key to table 1
[1)reported is the amount of catalyst K3 or K4 in ppm of metal content, based on the binder fraction of the coating material composition
[2)reported is the viscosity of the coating material composition as measured at room temperature in the DIN4 flow cup, directly after preparation and also after 1, 2 and 3 hours after its preparation
[3)measurement of the freedom from tack by the Zapon tack test after curing of the coating at 60° C. for 30 minutes, and beginning of the test after storage of the panels at room temperature for 10 minutes and also the measurement of the freedom from tack by the Zapon tack test when storing the coating at room temperature
[4)measurement of the pendulum hardness after storage of the coating for 1 or 7 days at room temperature
[5)measurement of the pendulum hardness after curing of the coating for 30 min at 60° C. and subsequent storage of the coating for 1 or 7 days at room temperature
[6)reported is the total length of the scratch track in cm, and also the length of the scratch track in cm after each of phases 1, 2, and 3
[7)reported is the time in minutes after which the imprint in the print test is no longer visible after drying at 60° C. for 15 minutes and after subsequent storage of the panels at room temperature for 10 minutes Discussion of the Test Results The comparison of inventive examples 1 and 2 with the corresponding comparative examples C1 and C2 shows that the coating materials of the invention are notable for rapid curing, even under the conditions of refinish, and hence for good assembly strength after just a very short time, without any serious adverse effect on the potlife as a result. Typically, a prolonged potlife with a poorer, i.e., slower, curing and therefore good assembly strength is obtained only after a significantly longer time. Finally, the curing of the coating materials of the invention is also more rapid, particularly in the case of room-temperature drying, than the curing of the coating materials without benzoic acid, as shown by a comparison of the results of the drying recorder for inventive examples 1 and 2 with comparative examples C1 and C2. The higher reactivity is also reflected in the development of hardness, as determined through the pendulum hardness.

Furthermore, the coating material of comparative example C3 was prepared in analogy to WO06/022899 with the Zn(1, 1,3,3-tetramethylguanidine)$_2$(2-ethylhexanoate)$_2$ complex and without aromatic carboxylic acid. In comparative example C4, finally, a coating material composition based on tin-containing catalysts was prepared. The composition of the coating materials of comparative examples C3 and C4 and also the test results of the resultant coatings are set out in table 2.

TABLE 2

Composition of the coating materials of comparative examples C3 and C4 in parts by weight, and also the test results on the resultant coatings

| Example | C3 | C4 |
|---|---|---|
| Millbase | 98.97 | 98.97 |
| Benzoic acid |  | 1.5 |
| Catalyst K2 | 0.250 |  |
| DIBUTYLTIN DILAURATE |  | 0.06 |
| Curing agent solution | 49.58 | 49.58 |
| Metal content[1) [ppm] | 275 | 140 |
| Experimental results | C3 | C4 |
| Potlife DIN 4 [s][2) | | |
| direct | 21 | 19 |
| after 1 h | 26 | 23 |
| after 2 h | 30 | 36 |
| after 3 h | 39 | 78 |
| Drying Recorder[3) | | |
| Total length [cm] | 25.2 | 17.2 |
| Phase 1 [cm] | 6.9 | 4.4 |
| Phase 2 [cm] | 11.2 | 6.5 |
| Phase 3 [cm] | 7.1 | 6.3 |
| Printe test-15 min 60° C./10 min RT[7) [min] | 340 | 80 |

Key to table 2:
[1)reported is the amount of catalyst K2 in ppm of metal content, based on the binder fraction of the coating material composition
[2)reported is the viscosity of the coating material composition as measured at room temperature in the DIN4 flow cup, directly after preparation and also after 1, 2 and 3 hours after its preparation
[3)reported is the total length of the scratch track in cm, and also the length of the scratch track in cm after each of phases 1, 2, and 3
[4)reported is the time in minutes after which the imprint in the print test is no longer visible after drying at 60° C. for 15 minutes and after subsequent storage of the panels at room temperature for 10 minutes Discussion of the Test Results As shown by the results of the print test for comparative example C3, the coating materials in analogy to WO06/022899 (based in other words on the Zn(1,1,3,3-tetramethylguanidine)$_2$(2-ethylhexanoate)$_2$ complex and without the addition of the benzoic acid) exhibit insufficient curing under the conditions of refinish, and hence an inadequate assembly strength. A comparison of inventive examples 1 and 2 with comparative example C4 shows that the coating material compositions of the invention have a significantly improved—that is, longer—potlife than the conventional coating material compositions based on tin-containing catalysts.

The invention claimed is:

1. A coating material composition comprising at least one polyhydroxyl group-containing compound (A), at least one polyisocyanate group-containing compound (B) having free and/or blocked isocyanate groups, at least one catalyst (D) based on a zinc-amidine complex which comprises the reaction product of 1.0 moles of one or more zinc(II) biscarboxylates with more than 2.0 moles of an amidine of the formula (I) or with more than 2.0 moles of a mixture of two or more amidines of the formula (I)

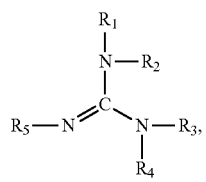

where $R_5$=hydrogen and $R_1$, $R_2$, $R_3$, and $R_4$ are each identical or different radicals, $R_1$ and $R_3$ being selected from the group consisting of hydrogen, an alkyl radical, and an aryl radical, and $R_2$ and $R_4$ being an alkyl radical or an aryl radical, and at least one monomeric aromatic, optionally substituted carboxylic acid (S) whose carboxyl group is in conjugation with a π-electron system.

2. The coating material composition of claim 1, wherein the radicals $R_2$ and $R_4$ are identical or different radicals selected from the group consisting of acyclic alkyl radicals, straight-chain alkyl radicals, branched alkyl radicals, aryl radicals, and mixtures of two or more of the foregoing; and the radicals $R_1$ and $R_3$ are identical or different and are selected from the group consisting of hydrogen, acyclic alkyl radicals, straight-chain alkyl radicals, branched alkyl radicals, aryl radicals, and mixtures of two or more of the foregoing.

3. The coating material composition of claim 2 wherein the radicals R1, R2, R3, and R4 are acyclic aliphatic alkyl radicals having 1 to 4 carbon atoms.

4. The coating material composition of claim 3 wherein the radicals R1, R2, R3, and R4 are methyl radicals.

5. The coating material composition of claim 1, comprising the zinc-amidine complex that is the reaction product of 1.0 moles of one or more of zinc(II)biscarboxylates with at least 2.5 moles of one or more amidines of the formula (I).

6. The coating material composition of claim 5, comprising the zinc-amidine complex that is the reaction product of 1.0 moles of one or more of zinc(II)biscarboxylates with 3.0 to 4.0 moles of one or more amidines of the formula (I).

7. The coating material composition of claim 1, wherein the zinc-amidine complex catalyst (D) comprises a carboxylate radical selected from the group consisting of carboxylate radicals of aliphatic linear and/or branched, optionally substituted monocarboxylic acids having 1 to 12 C atoms in the alkyl radical, aromatic, optionally substituted monocarboxylic acids having 6 to 12 C atoms in the aryl radical, and mixtures of two or more of the foregoing.

8. The coating material composition of claim 1, wherein that the coating material composition comprises as component (D) a member selected from the group consisting of $Zn(1,1,3,3\text{-tetramethylguanidine})_x((\text{acetate})_2$, $Zn(1,1,3,3\text{-tetra-methylguanidine})_x((\text{formate})_2$, $Zn(1,1,3,3\text{-tetramethylguanidine})_x((\text{benzoate})_2$, $Zn(1,1,3,3\text{-tetramethylguanidine})_x(2\text{-ethylhexanoate})_2$, $Zn(1,1,3,3\text{-tetramethylguanidine})_x((\text{octoate})_2$, $Zn(1,3\text{-diphenylguanidine})_x((\text{formate})_2$, $Zn(1,3\text{-diphenylguanidine})_x((\text{acetate})_2$, $Zn(1,3\text{-diphenylguanidine})_x((\text{benzoate})_2$, $Zn(1,3\text{-diphenylguanidine})_x(2\text{-ethylhexanoate})_2$, and/or $Zn(1,3\text{-diphenylguanidine})_x((\text{octoate})_2$, with x, in each case, being greater than or equal to 2.5.

9. The coating material composition of claim 8 wherein component (D) is selected from the group consisting of $Zn(1,1,3,3\text{-tetramethylguanidine})_x(2\text{-ethylhexanoate})_2$, $Zn(1,1,3,3\text{-tetramethylguanidine})_x((\text{octoate})_2$, $Zn(1,3\text{-diphenylguanidine})_x(2\text{-ethylhexanoate})_2$, $Zn(1,3\text{-diphenylguanidine})_x((\text{octoate})_2$, mixtures of two or more of the foregoing, and wherein x, in each case, is 3.0 to 4.0.

10. The coating material composition of claim 1, wherein the coating material composition comprises as carboxylic acid (S) a member selected from the group consisting of benzoic acid, tert-butylbenzoic acid, 3,4-dihydroxybenzoic acid, salicylic acid, acetylsalicylic acid, and mixtures of two or more of the foregoing.

11. The coating material composition of claim 1, wherein the coating material composition comprises at least one zinc-amidine complex (D) in an amount such that the metal content of the zinc-amidine complex, based in each case on a binder fraction of the coating material composition, is between 35 and 2000 ppm, and/or the coating material composition comprises 0.2% to 15.0% by weight, of at least one aromatic carboxylic acid (S), the percentages by weight in turn being based in each case on binder fraction of the coating material composition.

12. The coating material composition of claim 11, wherein the coating material composition comprises at least one zinc-amidine complex (D) in an amount such that the metal content of the zinc-amidine complex, based in each case on a binder fraction of the coating material composition, is between 100 and 1000 ppm, and/or the coating material composition comprises 0.5% to 5.0% by weight, of at least one aromatic carboxylic acid (S), the percentages by weight in turn being based in each case on a binder fraction of the coating material composition.

13. The coating material composition of claim 1, wherein the coating material composition comprises as component (B) at least one compound having free isocyanate groups.

14. The coating material composition of claim 13, wherein the coating material composition comprises as component (B) at least one compound selected from the group consisting of 1,6-hexamethylene diisocyanate, isophorone diisocyanate, 4,4'-methylenedicyclohexyl diisocyanate, the biuret dimers of the aforementioned diisocyanates, the isocyanurate trimers of the aforementioned diisocyanates, the asymmetric trimers of the aforementioned diisocyanates, and mixtures of two or more of the foregoing.

15. The coating material composition of claim 1, wherein the polyhydroxyl group-containing compound (A) is selected from the group consisting of polyacrylate polyols, polymethacrylate polyols, polyester polyols, polyurethane polyols and polysiloxane polyols.

16. The coating material composition of claim 15, wherein the polyhydroxyl group-containing compound (A) is selected from the group consisting of polyacrylate polyols, polymethacrylate polyols, and mixtures of two or more of the foregoing.

17. The coating material composition of claim 1, further comprising one or more hydroxyl-containing compounds (C) different from component (A), wherein the molar equivalents ratio of the hydroxyl groups in the hydroxyl-containing compound (A) plus optionally (C) to the isocyanate groups of component (B) is between 1:0.9 and 1:1.5.

18. The coating material composition of claim 17, wherein the molar equivalents ratio of the hydroxyl groups in the hydroxyl-containing compound (A) plus optionally (C) to the isocyanate groups of component (B) is between 1:0.95 and 1:1.05.

19. The coating material composition of claim 1, wherein the coating material composition is a nonaqueous coating material composition and/or the coating material composition comprises pigments.

20. A multistage coating method comprising the application of a film of the coating material composition of claim 1 to an optionally precoated substrate, wherein the coating material composition of claim 1 may be pigmented or unpigmented and a pigmented basecoat film may optionally be applied to the optionally precoated substrate prior to the application of the film of the coating material composition of claim 1.

21. The multistage coating method of claim 20, wherein application of the pigmented basecoat film is followed first by drying of the applied pigmented basecoat material at temperatures from room temperature to 80° C., and the application of the coating material composition is followed by curing at temperatures between 20 and 80° C.

22. The multistage coating method of claim 20 wherein the coating material composition is an automotive refinish coating material either pigmented or unpigmented and the optionally precoated substrate is selected from the group consisting of parts for installation in or on automobiles, plastics substrates, substrates of utility vehicles, and mixtures of two or more of the foregoing.

23. The multistage coating method of claim 20 wherein the coating material composition is an automotive coating, either pigmented or unpigmented, and the optionally precoated substrate is selected from the group consisting of plastics substrates, the substrates of utility vehicles, and mixtures thereof.

24. The coating material composition of claim 1, wherein the molar equivalents ratio of the hydroxyl groups in the hydroxyl-containing compound (A) to the isocyanate groups of component (B) is between 1:0.95 and 1:1.05.

25. A method for catalysis of a urethane reaction in a coating material composition comprising at least one polyisocyanate group-containing component and at least one polyhydroxyl group-containing component, the method comprising adding to the coating material composition at least one zinc-amidine complex (D) which is the reaction product of 1.0 moles of one or more zinc(II) biscarboxylates with more than 2.0 moles of one or more amidines of the formula (I),

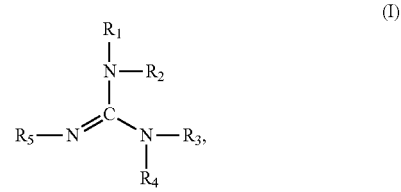

where $R_5$=hydrogen and $R_1$, $R_2$, $R_3$, and $R_4$ are each identical or different radicals, $R_1$ and $R_3$ being selected from the group consisting of hydrogen, an alkyl radical, and an aryl radical, and $R_2$ and $R_4$ being an alkyl radical or an aryl radical, and at least one monomeric aromatic carboxylic acid (S) whose carboxyl group is in conjugation with a π-electron system.

* * * * *